United States Patent [19]

Mani

[11] Patent Number: 5,234,705
[45] Date of Patent: Aug. 10, 1993

[54] METHOD OF MAKING PITA BREAD WITH REINFORCED SURFACES

[75] Inventor: Daniel Mani, 838 N. Doheny Dr., #501, Los Angeles, Calif. 90069

[73] Assignees: Simon Mani; Daniel Mani, Vernon, Calif. ; a part interest

[21] Appl. No.: 902,434

[22] Filed: Jun. 18, 1992

Related U.S. Application Data

[63] Continuation of Ser. No. 634,485, Dec. 27, 1990, abandoned.

[51] Int. Cl.⁵ .......................... A21D 8/00; A23P 1/00
[52] U.S. Cl. .................................. 426/496; 426/138; 426/503; 426/512
[58] Field of Search ............... 426/496, 502, 503, 549, 426/512, 138

[56] References Cited

U.S. PATENT DOCUMENTS

| | | | |
|---|---|---|---|
| 745,923 | 12/1903 | Stanley | 29/121.6 |
| 1,297,773 | 3/1919 | Adams | 425/328 |
| 1,726,566 | 9/1929 | Icre | 425/328 |
| 3,383,449 | 5/1968 | Müller | 425/328 |
| 4,425,695 | 1/1984 | Tokuno | 29/121.1 |
| 4,597,979 | 7/1986 | Goglanian | 426/138 |
| 4,702,926 | 10/1987 | Fowler | 426/549 |
| 4,775,543 | 10/1988 | Mani | 426/138 |
| 4,800,807 | 1/1989 | Mani | 99/450.2 |
| 4,828,861 | 5/1989 | Lammela | 426/496 |
| 4,889,043 | 12/1989 | Mani | 99/450.2 |

FOREIGN PATENT DOCUMENTS

| | | | |
|---|---|---|---|
| 58464 | 4/1913 | Austria | 29/121.1 |
| 61-268120 | 11/1986 | Japan | 425/366 |
| 456598 | 6/1975 | U.S.S.R. | 426/496 |

Primary Examiner—George Yeung
Attorney, Agent, or Firm—Blakely, Sokoloff, Taylor, Zafman

[57] ABSTRACT

An apparatus for the manufacture of pita bread having a roller with a regularly wavy profile to make the pita bread thicker at the edges defining the bottom of a pita loaf, and thinner in the middle defining the open end of the pita loaf after it is divided in half. The method of making pita bread and the pita bread so made are also described.

9 Claims, 2 Drawing Sheets

METHOD OF MAKING PITA BREAD WITH REINFORCED SURFACES

This is a continuation of Ser. No. 07/634,485 filed on Dec. 27, 1990, now abandoned.

BACKGROUND OF THE INVENTION

1. Field of the Invention

This invention relates to an apparatus for the manufacture of pita or pocket bread, which is typically stuffed with solid food and sometimes liquid materials, a method of making such pita bread using an apparatus of the type described herein, and pita bread so made.

2. Art Background

Pita bread, also known as pocket bread, is a bread of Middle Eastern origin dating back a number of centuries. In general, pita bread comprises a relatively flat bread having a generally rounded or oval shape and typically four to eight inches in diameter and one eighth to three eights inches in thickness. An important aspect of the pita bread is that as a result of a specific baking process described in more detail below, a pocket or inner chamber is formed which can serve to hold various food ingredients such as meats, grains, vegetables, sauces and the like, both liquid and solid materials. Thus, pita bread is usually stuffed with the foregoing components and eaten.

Pita bread is a common staple in middle eastern countries and in recent years has enjoyed considerable and increasing popularity in other areas of the world. This popularity is due in part to the convenience of using pita bread for making a sandwich since the bread, when torn open, forms a pocket which may be filled with meat, vegetables, cheese, and other edible material and is also often filled with sauces of various types.

Typically, the user will make a sandwich by tearing the pita bread in half, forming two semi-disks which can each be used to make a sandwich. Alternatively, the pita bread may be torn, cut, or otherwise severed to form a large and small disk segment, with the large disk segment being used to make a sandwich. Finally, not uncommonly, the pita bread may be cut or torn along one circular edge so that the entire pita bread may be filled with edible material to make a larger sandwich.

In the manufacture of pita bread, the components of the bread, basically comprising flour, water, yeast, sugar, and salt, as is known in the prior art, are mixed together in a large hopper. The dough made thereby is then allowed to rise. In some commercial systems the dough is then flattened and is formed or cut, usually on a conveyor system, into the shape of the flattened circular or oval bread product. In other commercial systems, it is rolled into the shape of a ball of dough and then flattened to form a large flat dough disk, like a large pancake.. The pita bread in its flattened or circular shape is than allowed to rise slightly. It is thereafter baked in an oven on a flat support surface, typically at a temperature in excess of 500° Fahrenheit. This high temperature baking causes the outer surface of the bread dough to initially sear and thus sealing the surfaces of the dough. The dough in the center of the pita then bakes and, as a result thereof, liberates gas and steam from the dough. This gas and steam is entrapped within the seared outer surface thereby creating pressure within the dough so that it inflates. Since the gas is unable to escape, this internal pressure separates the upper and lower surfaces so that the pita bread resembles an inflated balloon. The inflation continues until the pita ruptures at its weakest location and the steam and gas created by the baking escape.

After baking, the pita bread is allowed to cool and the pita resumes its flat, pancake-like appearance. However, since the upper and lower surfaces of the pita bread were formed during the baking process, these surfaces remain distinct and separate.

As indicated above, a common use for pita bread is the formation of a sandwich. Typically, a user will tear the pita bread in half, forming two semi-disks of dough. These semi-disks will have a relatively straight edge on one side, exposing the two distinct layers of the pita bread, and will have a sealed semi-circular remaining edge. The user can then separate the layers along the torn or cut straight edge and spread these layers, forming a pocket with each pita bread half. Edible material such as meats, cheeses, vegetables, bread and other grain products, etc., may be stuffed into the open pocket to form a sandwich. Sauces may then be applied over the stuffing. One reason for the popularity of this type of pita sandwich is the fact that the pita bread half forms a natural pouch which is relatively durable and thus not likely to spill when the sandwich is eaten, and which also has less bread than more common sandwiches, thus yielding a lower calorie sandwich.

A major drawback in the manufacture of pita bread is that during the baking process, as the pocket inside the pita bread expands, the gases contained therein expand an uncontrolled amount thereby causing tears, breaks and crevices in the surface of the pita bread. This tends to cause substantial problems because such tears or crevices create permanent faults in the surface of the pita bread which can result in leaks of the food and sauces contained in the pocket after it is stuffed. Obviously, such leaks can be messy if the sauces, unbeknownst to the eater, leak onto the eater's clothing, hands and the like. In addition to the sauces and juices leaking out through the cracks and crevices in the surface, they also sometimes leak out through the bottom after the bottom of the pita loaf, as defined by the edge formed by the joining of the two layers of the pita, has absorbed all of the liquid it can, particularly if an excess amount of liquid is applied to the contents of the sandwich.

This problem of obtaining undesired faults in the surface of the pita bread was addressed in a United States Patent obtained by Goglanian (U.S. Pat. No. 4,597,979). Goglanian describes creating small holes in the surface of unbaked pita bread, preferably along the diameter thereof, so that when the perforated pita bread is baked, additional rupturing occurs on the surface thereof, which rupturing allows the escape of the gases inside the pita pocket. Goglanian also describes a number of devices for the manufacture of the invented pita, generally comprising multiple steps and manual perforation of each loaf.

There are a number of drawbacks to the Goglanian system in that the rupturing of Goglanian's pita is not well controlled. Specifically, the Goglanian perforated pita can rupture anywhere along the entire perforated surface. Moreover, rupturing is unnecessary for the production of perforated pita bread, and probably, as a practical matter, the rupturing does not always occur at the perforated site, or even at all. With regard to this last pint it may be appreciated that the application of tiny holes to a major surface comprised of soft and malleable dough will not always be sufficient to define the rupture site. Of course, it would be appreciated by a person of ordinary skill in the art that it is most desirable to make a pita bread where the probable site of rupturing is well defined and certain.

The inventor hereof has obtained several patents proposing various systems which are improvements in the method and apparatus for making pita bread. U.S. Pat. No. 4,889,043 discloses an apparatus for making pita bread comprising a conveyor belt for carrying the pita dough in a long flattened sheet thereon, a cylindrical roller having circular blades on its surface for cutting out the circular flat pitas, and a circular saw-tooth blade disposed adjacent and perpendicular to the conveyer so that the blade perforates the pita dough as it is transported past the blade. The method of making pita bread using the aforementioned device is also disclosed.

A similar device is disclosed in U.S. Pat. No. 4,800,807, which discloses the same cylindrical roller with circular blades on its surface, and instead of the circular saw-tooth blade, the circular blades have disposed therein along a chord of the circle, a flat saw-tooth blade which perforates the pita dough.

In U.S. Pat. No. 4,775,543, a method of making pita bread with a pressure relief hole is described in which one pita bread is overlapped by an adjacent pita bread during the baking process so that the overlapped pita bread does not fully bake, and is therefore weaker than the baked portion thereof. Accordingly, each loaf of pita bread, when baked, has an intentionally weakened area which ruptures as the pocket expands. The area of the rupture is relatively large, the overlap preferably being about ¼ inch. Also, the area of rupture includes a small portion of an end seam, so that it becomes desirable to cut off the ruptured portion of the pita in order to stuff it, since the ruptured area obviously cannot contain food, particularly liquids, therein.

The present device and process overcome the limitations of the prior art to produce a pita bread having the desirable characteristics of reinforced surfaces, and particularly the surfaces at or near the bottom of the pita to minimize the risks of rupturing during the baking process and when stuffed, and to reinforce the bottom of the pita sandwich to provide both strength and increased absorption of the sauces and juices of the sandwich.

SUMMARY OF THE INVENTION

The present invention comprises an apparatus for the manufacture of pita bread having a reinforced bottom area to provide support and absorptive capability to the pita bread, a process for making such reinforced pita bread and pita bread make in accordance with the invented apparatus and method.

The apparatus of the present invention in its preferred embodiment creates pita bread loaves with predetermined areas of reinforcement intended to withstand pressure when formed into a sandwich and filled, and the pressure formed within the pita bread when baked, as well as providing the pita bread with the ability to absorb and retain liquids, including sauces and juices without substantial risk of failure.

The focus of the present invention is in the rolling of the dough into flattened sheets, and particularly, the shape of the roller, or rollers used to create the flat sheets of dough prior to cutting with a die and optionally, but preferably, perforating. The rollers may also be used with the sheeting (rounding) type of pita manufacturing, the subject rollers being disposed in proper alignment with the pita loaves after formation, as the last roller in the series. The profile of at least one of the rollers for flattening the sheets of dough is a regular wavy shape such that when disposed on a flat surface, the surface of the roller touches the flat surface at generally regular intervals and is raised off of the flat surface at the other points along the roller. Thus, in one embodiment of the present invention, the flattened sheets of dough or pita loafs are made using one roller which has flat profile and a second roller with a wavy profile. The roller is arranged and aligned with the pita cutters such that the dough is thicker on the edges of the pita loaves which will define the bottom, and thinner in the middle of the loaves defining the center area which is to be cut. This configuration not only provides for additional absorptive ability and strength of the bottom surface, but also provides a thinner surface to be torn or cut at the center of the pita load making it easier to separate the halves.

In another embodiment, similarly shaped and aligned wavy rollers are provided on the top and bottom surfaces so that the flattened pita bread dough has a corresponding wavy surface on both its top and bottom. The location of the thick and thin portions of the pita loaves are the same as set forth above, namely, thick at the bottom edges of the pita loafs and thin at the top edge. This embodiment provides additional pronounced wavy features for the same benefits described above, but where the loafs are even thinner in the thin region and thicker in the thick region.

Perforations are preferably provided in the pita loaves by any means known in the art. In such embodiments, perforations are usually provided in a line across the diameter of the pita loaf which is disposed in the thinnest portion of the pita loaves and aligned along that portion. The perforations, if provided, are of such depth and width so as to provide convenient exit of the gases produced therein during the baking to the outside to relieve the pressure therein without rupturing.

As stated above, the perforations, if provided, may be made any of several ways known in the art. They may be made using a hand-held instrument, although the preferred method is automated. As is known in the art through my prior patents, the automated methods of making perforations is by means of a circular saw blade disposed in communication with the conveyor belt on which the pita load is disposed, or by providing saw tooth blades within the circular pita cutters.

The saw-tooth shape is of the appropriate dimensions such that the perforations formed in the dough are of sufficient depth and width that when gases are formed in the dough during the baking thereof they inflate the dough to form the pocket therein, but otherwise, are incapable of causing the surface of the pita, particularly along the perforated line created by the pita cutter, to rupture. As such, evenly shaped perforated pita loaves are cut from the dough disposed on the conveyor. The pita cutters are disposed on the drum in a geometry to obtain a large number of perforated pita loaves per volume of dough. The remainder dough may be removed by hand or by machine, and returned to the hopper or elsewhere on the conveyor line.

In an alternate embodiment, a thin sheet of dough disposed on the conveyor system is first perforated with an appropriately positioned perforating blade such as a flat blade or a rotating wheel, and is then cut into its final rounded shape utilizing a pita cutter disposed on a rotating drum, as described above. However, in this embodiment, the perforating blade is lacking from the circular pita cutting blade. After the pita loaves are cut out and optionally perforated, they are then baked as is known in the art.

The pita loaves may also be made by hand or made by sheeting machines as is known in the art, wherein each loaf is first made into a ball, and then rolled out in two different directions as is known in the art to form a substantially round loaf.

In addition to the apparatus described herein, the present invention also comprises the method of making pita bread utilizing the apparatus described herein. The present invention further comprises pita loaves made in accordance with the process of the present invention and/or made with the presently invented apparatus described herein.

DETAILED DESCRIPTION OF THE INVENTION

In one embodiment of the prior art, apparatus for manufacturing and baking pita bread typically comprises first a mixer to blend the various ingredients used in making pita bread dough. The mixed dough is allowed to rise somewhat and is then rounded and formed into individual spheres of dough, which are then transported on a conveyor to rising or proofing apparatus. In the rising or proofing apparatus the dough balls are subjected to warm temperatures so that the dough will rise to form larger spheres. These spheres or balls are then transported on conveyor belts and pass beneath a first set of rollers which form the balls or spheres into flat oval shapes resembling oval pancakes.

The dough is then conveyed in a direction which is perpendicular to the direction of transportation to the first roller and the dough passes under a second roller which forms the circular flat shape typical of round pita loaves. The pita bread is then ready for baking and, if baked in this form, would yield typical pita bread.

As the dough bakes, steam and other gas is formed by the baking process. This steam and other gas is captured within the dough and causes the dough form to inflate, separating the upper and lower surfaces of the pita bread into two distinct layers. The pita bread is then cooled. During this cooling, the bread again flattens into the characteristic pita bread shape. After cooling, the pita bread is stacked and packaged for sale.

In another embodiment of the prior art, after the pita bread dough is made as described above, it is applied to a conveyor belt and rolled under a first roller and then a second roller until a thin sheet of dough is disposed over the entire or primarily all of the conveyer belt. The sheet of dough is then transported under a die which cuts out individual pita loaves. These pita loaves are then subjected to the proofing and baking steps as described above. Withe respect to either of the foregoing prior art methods of making the pita bread, the subject invention may be utilized to create an improved pita bread in accordance with the present invention.

Figure 1:
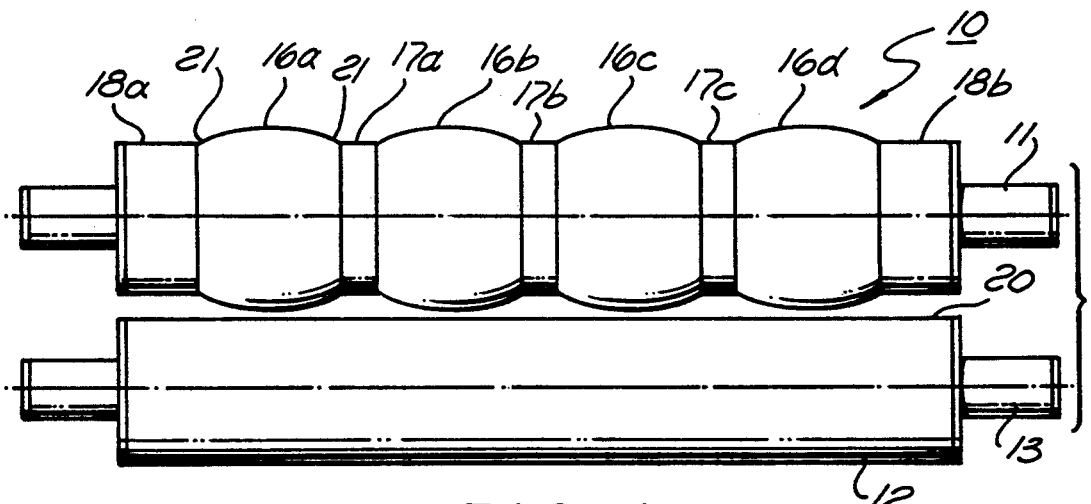
FIG. 1 is a front view of the upper and lower rollers of the present invention.

Shown in FIG. 1 is one embodiment of the present invention. In the embodiment shown in FIG. 1, there are a pair of rollers 10 and 12. Roller 10 is a wavy roller, that is, a roller having a wavy profile and roller 12 is a flat roller, that is, a roller having a flat profile. Roller 12 can also represent the roller of a conveyor system. Roller 10 rotates about and is supported by shaft 11 and Roller 12 rotates about and is supported by shaft 13. In place of the shafts, supporting pins may be used as is known in the art.

Wavy roller 10 is comprised of a plurality of regularly spaced apexes or peaks 16a-16d and valleys 17a-17c. There is a continual and gradual slope from the apexes 16 to the valleys 17, giving the appearance in profile of waves. The volume 20 between roller 10 and roller 12 is correspondingly comprised of thin areas, corresponding to the apexes 16 and thicker areas corresponding to the valleys 17. The center of each pita bread to be formed in accordance with the present invention should be aligned with highest point (the largest circumference) of the roller 10. In this way, the center of the pita breads will be made of the thinnest material, as will be explained below. Conversely, the bottoms of the pita breads correspond to the valleys 17, or portions near the valleys 21 so that the pita breads will be thickest at these positions corresponding to the bottom of the pita bread. In the preferred embodiment wherein a sheet of pita dough is disposed across an entire conveyer, the sheet of pita dough is fed between rollers 10 and 12 through space 20. If a sheeting apparatus is used to create the pita, the pita bread formed thereby must be aligned so that the center thereof is disposed at or near the apex 16 of the roller 10.

It will of course be appreciated by a person of ordinary skill in the art that the number of apexes 16 is immaterial to the practice of the present invention and any number from one or more may be used within the spirit and scope of the present invention.

Figure 2:
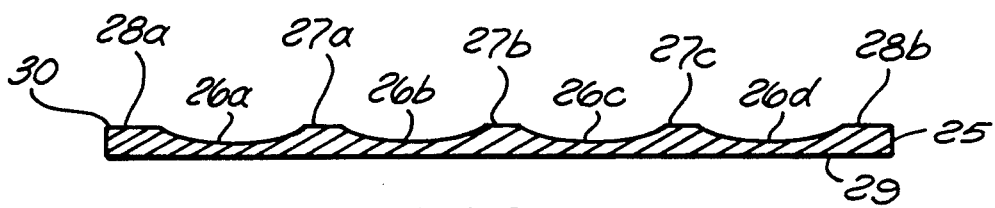
FIG. 2 is a cross-sectional view of pita dough obtained after being rolled between the rollers of FIG. 1.

FIG. 2 depicts pita dough obtained after processing through the rollers of FIG. 1. FIG. 2 is arranged to show the cross-section of the dough as if it were coming out of the rollers at the positions indicated. That is, for example, dough 25 has indentations 26a, 26b, 26c and 26d corresponding with apexes 16a, 16b, 16c and 16d. Similarly, valleys 17a-17c correspond to the wide portions 27a-27c of the dough 25. Also, wider portions 28a and 28b of the dough correspond to the more recessed portions 18a and 18b of the roller 10. As is evident from the drawings, bottom 29 of pita dough 25 is flat, corresponding to the flat surface of roller 12 and top 30 of pita dough 25 is lumpy, corresponding to the contours of roller 10.

Figure 3:
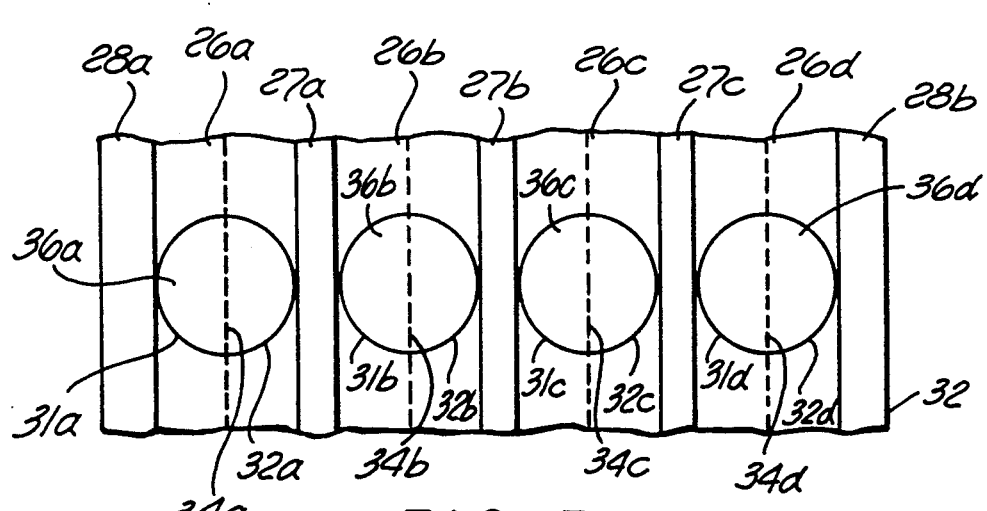
FIG. 3 is a plan view of the pita dough obtained after being processed by the the rollers of FIG. 1 and showing the individual pita bread in cut-out conformation with perforations going therethrough.
Figure 12:
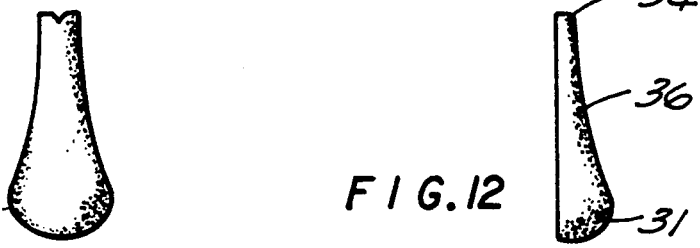
FIG. 12 is an enlarged side view looking at the edge of FIG. 9 showing the profile of a split pita loaf in accordance with the invention of FIGS. 1-4.

FIG. 3 shows a plan view of the dough of FIG. 2 after it has been die-cut and perforated. The dough of FIG. 3 is aligned with the dough of FIG. 2 showing what a plan view of the dough of FIG. 2 would look like. Thus, the flattened ends 28a and 28b, the thin portions 26a-26d, and the raised portions 27a-27c are all shown. As can be seen by comparing FIGS. 2 and 3, along with FIG. 4, the center of each of the pitas 34a-34d is perforated. Also, however, the centers are very thin at positions 26a through 26d so that the centers of the full pitas which correspond to the line which will be torn are thin. Conversely, the outside perimeter 31 and 32(31a-31d and 32a-32d) correspond to the bottoms of the pita loaves after they are split. Accordingly, the bottoms are substantially thicker, as specifically depicted in FIG. 12, so that it is more absorbent of any fluids, sauces, meat juices and the like, which are disposed in the pocket thereby strengthening the bottom of the pocket. Accordingly, since the whole bottom is thickened and thereby strengthened it serves to absorb the liquids rather than having them run out through the bottom and also serves to strengthen the bottom so that it does not break.

As is now known in the art, the perforations can be used to separate the pita halves. The perforations are intentionally placed along the line defined by the center of the pita bread so that it is known where to cut or tear the pita bread into halves so that the reinforced bottoms of the half pita loaves are properly disposed.

Figure 4:
FIG. 4 is a cross-sectional view of the pita loaves produced as shown in FIG. 3 above.

FIG. 4 depicts the individual pita loaves 36a-36d. The remainder of the dough is recycled as is known in the art. As shown in FIG. 4, the configuration of the pita loaves 36a-36d is such that the center defined at 34a-34d is thinnest and the edges 31 and 32 are the thickest portions of the pita loaves. Thus, as is shown in the enlarged FIG. 12, when the pita is split in half, the edge 34 is relatively narrow and the bottom 31 is substantially thicker than the edge 34.

Figure 5:
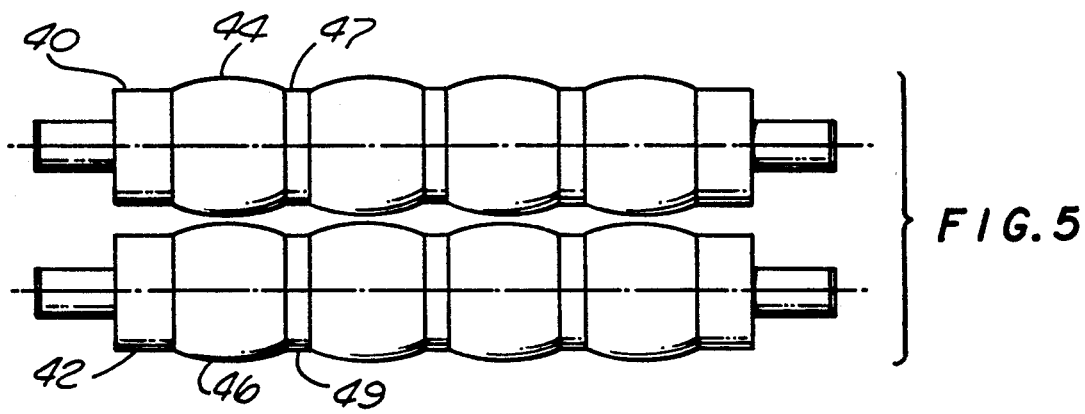
FIG. 5 is another embodiment of the present invention showing two corrugated rollers.

As shown in FIG. 5, which depicts another embodiment of the present invention, the top 40 and bottom 42 rollers each have the wavy conformation of roller 10 of FIG. 1. The wavy conformation of each of rollers 40 and 42 is aligned such that the apexes 44 and 46 of each roller are adjacent each other and similarly, the valleys 47 and 49 are adjacent each other as well. Accordingly, unlike the bottom flat conformation shown in FIG. 2, the cross-sectional view of FIG. 6 shows that the center 48 of each repetition of the dough is indented on both the top 50 and the bottom 52 of the dough 51.

Figure 6:
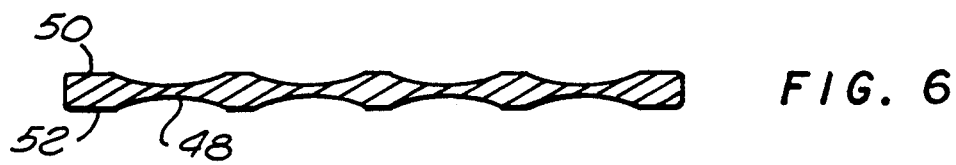
FIG. 6 is a cross-sectional view of pita dough obtained after being rolled between the rollers of FIG. 5.
Figure 7:
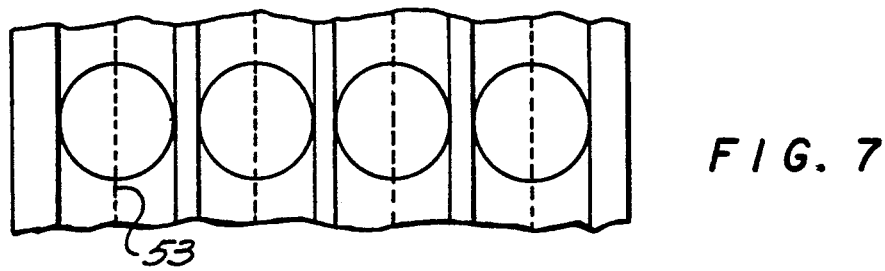
FIG. 7 is a plan view of the pita dough obtained after being processed by the the rollers of FIG. 5 and showing the individual pita bread in cut-out conformation with perforations going therethrough.
Figure 8:
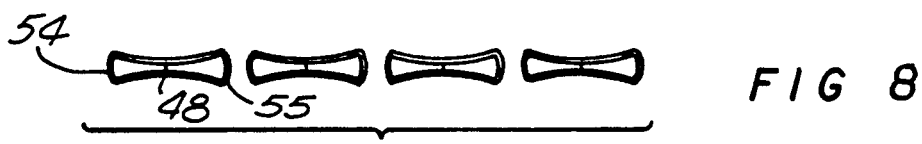
FIG. 8 is a cross-sectional view of the pita loaves produced as shown in FIG. 5 above.
Figure 9:
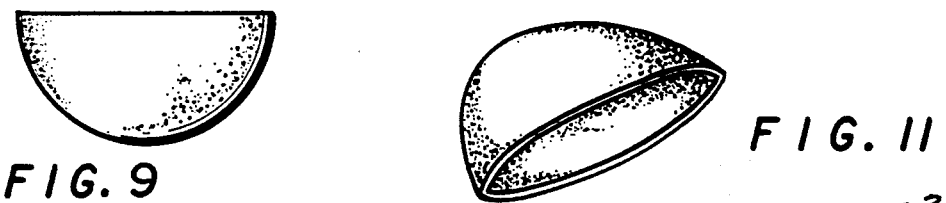
FIG. 9 is an enlarged plan view of a split pita loaf in accordance with the present invention.
Figure 11:
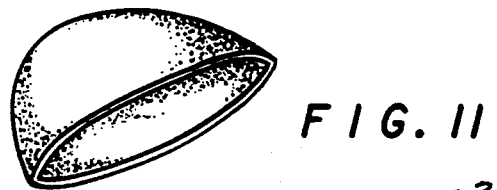
FIG. 11 is a perspective view of an open pita bread made in accordance with the present invention.
Figure 10:
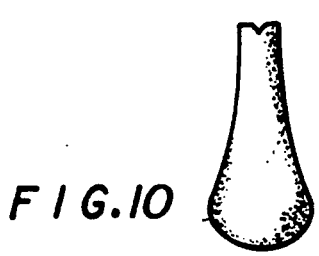
FIG. 10 is an enlarged side view looking at the edge of FIG. 9 showing the profile of a split pita loaf in accordance with the invention of FIGS. 5-8.

FIG. 7 depicts a plan view of the dough 51 of FIG. 6 showing it after it has been die-cut and perforated in accordance with the methods known in the prior art. As specifically shown in FIG. 8, the center 48 of each of the pieces of pita bread produced in accordance with the present invention is thinner or narrower than the ends 54 and 55. Accordingly, the ends 54 and 55 which become the bottom of pita loaf halves after the pita bread is split along perforation 53 thus creating the strong bottom of the present invention as is known in the art.

It will be appreciated by a person of ordinary skill in the art that the present invention could also be applied to standard sheeting devices wherein balls of dough are first rolled and then flattened in two separate directions in order to make them substantially round. In this configuration, it is necessary that the last roller be a wavy roller as shown in FIGS. 1 or 5 in order to provide the individual pieces of pita dough with the proper orientation and conformation. The rollers in such embodiment must be carefully aligned with the sheeter so that the dough produced therein is properly shaped.

It would be obvious to a person of ordinary skill in the art that a number of changes and modifications can be made to the existing apparatus and process without departing from the spirit and scope of the present invention. It is contemplated that the present invention is encompassed by the claims as presented herein and by all variations thereof coming within the scope of equivalents accorded thereto.

What is claimed is:

1. A method of making pita bread loaf which when cut open in use has a reinforced bottom portion comprising the steps of:
   forming pita bread dough into a generally flattened circular shape;
   subjecting said pita bread dough to a shaping means to make the thickness of the pita bread dough at the center portion of the circular shape relatively thin and the thickness of the pita bread dough at opposing parallel edge portions of the circular shape pita bread dough relatively thicker than at said center portion; and
   baking said shaped pita bread dough into a pita loaf having an expanded pocket therein;
   whereby when said baked pita bread loaf is cut open on a line along or parallel to said center portion, said pita bread loaf is thicker at said opposing parallel edge portions than at said center portion, thereby increasing the strength and absorbing capability of said pita bread loaf.

2. The method of claim 1, further comprising the step of perforating said dough along said center portion.

3. The method of claim 1 wherein said shaping means is a roller having a wavy surface along its length, said roller having a circular cross-section with a larger diameter at a position which aligns with the center portion of said pita bread dough and a circular cross-section with a smaller diameter at a portion which aligns with each of the opposing parallel edge portions of said pita bread dough.

4. The method of claim 1 wherein said step of forming said pita dough into a generally flattened circular shape comprises flattening said dough into a generally flat form, cutting said dough into round shaped pita dough with a die cutting means and removing the portion of said flattened dough form which is not part of the round shaped pita dough.

5. The method of claim 1 wherein said pita bread dough is formed into a generally flattened circular shape by a sheeting means prior to being subjected to said shaping means.

6. The method of claim 1 wherein said pita bread dough is subjected to two rollers, one roller being disposed above, and the other roller being disposed below said pita bread dough to produce a pita bread dough having the same shape on its top and bottom surfaces.

7. The method of claim 1 wherein the thickness of the pita dough at the center portion is thinner than the thickness of any of the remainder of the pita bread dough.

8. A method of making pita bread loaf which when cut open in use has a reinforced bottom portion comprising the steps of:

forming pita bread dough into a generally flattened circular shape;

rolling said pita dough with a generally wavy roller to make the thickness of the pita bread dough at the center portion of the circular shape relatively thin and the thickness of the pita bread dough at opposing parallel edge portions of the circular shape pita bread dough relatively thicker than at said center portion; and baking said shaped pita bread dough into a pita loaf having an expanded pocket therein;

whereby when said baked pita bread loaf is cut open on a line along or parallel to said center portion, said pita bread loaf is thicker at said opposing parallel edge portions than at said center portion, thereby increasing the strength and absorbing capability of said pita bread loaf.

9. The method of claim 7, further comprising the step of perforating said pita dough along said center portion.

* * * * *